United States Patent [19]

Nishimoto et al.

[11] 4,456,646
[45] Jun. 26, 1984

[54] LAMINATE FILM HAVING A HEAT-SHRINKAGE RATE GREATER THAN 15 PERCENT AT 90° C.

[75] Inventors: Yoshiharu Nishimoto; Kengo Yamazaki, both of Iwaki, Japan

[73] Assignee: Kureha Kagaku Kogyo Kabushiki Kaisha, Tokyo, Japan

[21] Appl. No.: 313,622

[22] Filed: Oct. 21, 1981

[30] Foreign Application Priority Data

Oct. 31, 1980 [JP] Japan .................. 55-153450

[51] Int. Cl.³ ......................................... B32B 27/08
[52] U.S. Cl. ................................. 428/216; 428/521; 428/522
[58] Field of Search ............... 428/518, 516, 215, 520, 428/522, 336, 216

[56] References Cited

U.S. PATENT DOCUMENTS

| | | | |
|---|---|---|---|
| 3,524,795 | 8/1970 | Peterson | 428/518 |
| 4,096,946 | 6/1978 | Cook et al. | 428/518 |
| 4,161,562 | 7/1979 | Yoshikawa et al. | 428/518 |
| 4,278,738 | 7/1981 | Brax | 428/518 |
| 4,352,850 | 10/1982 | Yamamoto et al. | 428/349 |
| 4,357,376 | 11/1982 | Nattinger et al. | 428/518 |

FOREIGN PATENT DOCUMENTS

| | | | |
|---|---|---|---|
| 982923 | 2/1976 | Canada. | |
| 5267842 | 1/1979 | Japan. | |
| 1379106 | 1/1975 | United Kingdom | 428/518 |

*Primary Examiner*—Marion McCamish
*Assistant Examiner*—E. Rollins Buffalow
*Attorney, Agent, or Firm*—Wegner & Bretschneider

[57] ABSTRACT

Described is a laminate film excellent in oil-resistance, heat-resistant sealing ability, peel resistance and gas-barriering property having a percentage of heat-shrinkage of larger than 15% at 90° C. comprising a center layer consisting of a copolymer(I) of vinylidene chloride and both two outermost layers consisting of a mixture of 20 to 70% by weight of a copolymer(II) of ethylene and alpha-olefin of density of 0.900 to 0.950 and of crystalline melting point of 110° to 125° C. and 80 to 30% by weight of a copolymer(III) of ethylene and vinyl acetate with the proviso that the content of the copolymer-(II) in the total amount of copolymers in both the two outermost layers is less than 65% by weight and showing a structure of having an adhesive layer between the center layer and the outermost layer.

6 Claims, 2 Drawing Figures

LAMINATE FILM HAVING A HEAT-SHRINKAGE RATE GREATER THAN 15 PERCENT AT 90° C.

BACKGROUND OF THE INVENTION

The present invention relates to a heat-shrinkable laminate film having a center layer of a copolymer of vinylidene chloride (hereinafter referred to as PVDC), both two outermost layers of a mixture of a copolymer of ethylene and alpha-olefin of a crystalline melting point of 110° to 125° C. and a copolymer of ethylene and vinyl acetate (hereinafter referred to as EVA) of a crystalline melting point of 85° to 103° C. and two adhesive layers each of which is inserted between the center layer and the outermost layer.

Heat-shrink packaging is industrially most convenient as packing for foodstuffs having irregular shapes such as raw meats, cooked meats, cheeses and other fatty foodstuffs. In addition, since a long period of preservation is required to these packed foodstuffs, gas-barrier property is necessary for such a packaging material. Moreover, since it is necessary to subject the packed foodstuffs to heat-treatment for a certain time period for sterilization in the case where the foodstuff is cooked meat (for instance, for at least 8 minutes at 90° C. against *Escherichia coli*), oil-resistance and peel-resistant of the sealed parts in the heat shrinkage (hereinafter referred to as peel-resistant) are required to the packing material. More in detail, there are problems in packing and sterilizing the fatty foodstuffs of breaking the thinly stretched outermost layer which is softened by fats and heat and of breaking the seal part or its vicinity of the packing material due to the heat-shrinking stress generating at the time of thermal sterilization or at the time of packing, and accordingly, a packaging material (film) of excellent oil-resistance and peel-resistant is keenly demanded in such a case.

As a heat-shrinkable film of gas-barrier property, a film consisting solely of PVDC, a laminate film of construction of EVA/PVDC/EVA disclosed in Canadian Pat. No. 982,923, and a cylindrically formed laminate film of construction of EVA/PVDC/irradiated EVA by radioactive rays disclosed in Japanese Patent Application Laying Open No. 34565/72, etc. are enumerable.

However, the film consisting solely of PVDC has defects of causing hygienically undesirable cases where the additives such as plasticizers and stabilizers in the film migrate into the packed foodstuff according to the kinds of the packed foodstuffs and becoming an undesirable state for preserving the foodstuffs due to the reduction of gas-barrier property owing to the relatively large amount of the additives for maintaining cold-resistant strength of the film, etc.

Since the laminate film of the construction of EVA/PVDC/EVA has the EVA layer as the outermost layer which is high in cold-resistant strength, it is not necessary to add a large amount of the additive into PVDC and accordingly, the problem of reduction of gas-barrier property has been solved, however, EVA has a defect of being poor in oil-resistance and peel-resistant.

In Japanese Patent Application Laying Open No. 34565/72, a cross-linked EVA by radioactive rays is used for the purpose of improving the oil-resistance, however, only as one of the outermost layers for the fear of causing decomposition of PVDC in the center layer by the radioactive irradiation. In addition, heat-resistant seal ability and peel resistance are not improved by the cross-linking by radioactive irradiation on EVA.

In order to obtain the laminate film excellent in oil-resistance, it is desirable to use a polymer of alpha-olefin of, for instance, a crystalline melting point of higher than 110° C. as the two outermost layers. However, since the polymer of alpha-olefin of the crystalline melting point of higher than 110° C. is poor in stretchability, it is impossible to uniformly stretch after being laminated with a PVDC layer, and accordingly, heat-shrinkable laminate film can not be available.

In addition, in cases where polyethylene of low density of a crystalline melting point of lower than 110° C. or an ionomer is used, there are the defects of poor heat-resistant seal ability and pee resistance.

According to the above-mentioned reasons, a heat-shrinkable film excellent in oil-resistance, peel-resistant and gas-barrier property has been demanded in the field of food-packaging.

As a result of elaborated studies, the present inventors have found that the laminate film comprising a center layer of a copolymer (I) of vinylidene chloride, both the two outermost layers of a mixture of 20 to 70% by weight of a copolymer (II) of ethylene and alpha-olefin of a density of 0.900 to 0.950 and of a crystalline melting point of 110° to 125° and 80 to 30% by weight of a copolymer(III) of ethylene and vinyl acetate of a crystalline melting point of 85° to 103° C. and adhesive layer between the center layer and the outermost layer and having a percentage of heat-shrinkage of larger than 15% at 90° C., with the proviso that the content of the copolymer(II) in the total weight of both the two outermost layers is less than 65%, is excellent in oil-resistance, peel-resistant and gas-barrier property.

It is an object of the present invention to provide a new heat-shrinkable laminate film for packaging foodstuff. It is another object of the present invention to provide a new heat-shrinkable laminate film, having an excellent properties in oil-resistance, peel-resistance and gas barriering properties.

DETAILED DESCRIPTION OF THE INVENTION

Figure 1:
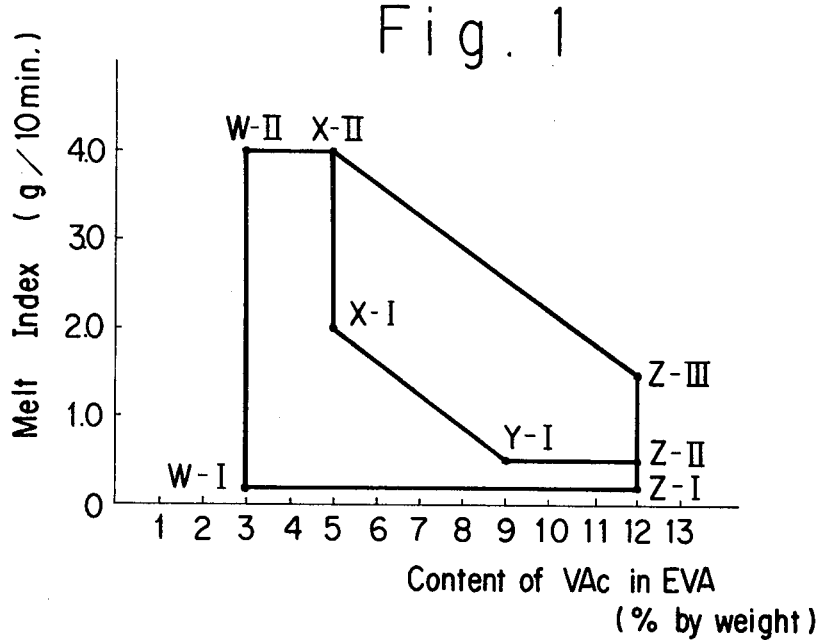
FIG. 1 shows the range of composition of the copolymer(III) of ethylene and vinyl acetate, the ordinate showing the melt index of the copolymer (g/10 min) and the abscissa showing the content (% by weight) of vinyl acetate units in the copolymer.

The present invention relates to a heat-shrinkable film excellent in oil-resistance and peel-resistant and uniformly stretchable without giving minute local necking.

The heat-shrinkable film accordiing to the present invention comprises a center layer of PVDC and two outermost layers both of which consist of a mixture of at least 20% by weight of a copolymer of ethylene and alpha-olefin having a crystalline melting point of 110° to 125° C. and EVA of a crystalline melting point of 85° to 103° C. and relatively rich in stretchability, and the film according to the present invention is superior in oil-resistance and peel resistant as compared to the laminate film having a polymer of alpha-olefin of a crystalline melting point equal to the mean value of the crystalline melting points of the above-mentioned polymers of alpha-olefin as the two outermost layers.

In order that EVA of a crystalline melting point of 85° to 103° C. plays a role of improving the stretchability, it is necessary that such EVA is contained in each of the two outermost layers in an amount of at least 30% by weight. Accordingly, the resin of the two outermost layers consists of a mixture of 20 to 70% by weight of a copolymer(II) of ethylene and alpha-olefin of a crystalline melting point of 110° to 125° C. and 80 to 30% by weight of a coplymer(III). Besides, in order to carry out the heat-shrinking packing conveniently in industrial scale, the film having a rate of heat-shrinkage of higher than 15% at a temperature of 90° C. is desirable. In order to prepare a film of a rate of heat-shrinkage of higher than 15%, it is necessary to maintain the temperature at stretching as low as possible. For that purpose, it is necessary that EVA of a crystalline melting point of 85° to 103° C. which is rich in stretchability at a low temperature is contained in an amount of at least 35% to the total amount of polymers in both the two outermost layers, and the amount of copolymer(II) in the total amount of polymers in both of the two outermost layers should be less than 65% by weight.

As the copolymer(II) of ethylene and alpha-olefin of a crystalline melting point of 110° to 125° C., copolymers of ethylene and a small amount (1.0 to 30% by weight) of alpha-olefin of carbon number of less than 18, for instance, butene-1, pentene-1, 4-methylpentene-1, hexene-1, octene-1, octene-1, etc. are used.

These copolymers are those referred to as linear low-density polyethyelene (L-LDPE) of a density of 0.900 to 0.950 g/cc and of a crystalline melting point of 110° to 125° C., for instance, ULTZEX, NEOZEX (both made by Mitsui Petrochemical Co.) and DOWLEX (made by Dow Chemical Co.), and are produced by copolymerization by using a catalyst consisting mainly of a transition metal. These copolymers are rich in stretchability in spite of their relatively high crystalline melting point and moreover, they are tenacious and rich in anti-stresscracking property.

As EVA which is mixed with the above-mentioned copolymer(II) of ethylene and alpha-olefin, those of the content of vinyl acetate units of 3 to 12% by weight are used. EVA selected from these ranges of properties is fairly compatible with the copolymer(II) to be rich in transparency and is oil-resistant, peel-resistant and easily stretchable.

Among such EVA, those included in the pentagonal range made by connecting the five points in FIG. 1, i.e., W-I (3,0.2), W-II (3,4.0), X-II (5,4.0), Z-III (12,1.5) and Z-I (12,0.2) with linear lines are preferable because of their excellent oil-resistance after mixing with the copolymer(II) of ethylene and alpha-olefin. Moreover, those included in the heptagonal range made by connecting the seven points in FIG. 1, i.e., W-I (3,0.2), W-II (3,4.0), X-II (5,4.0), X-I (5,2.0), Y-I (9,0.5), Z-II (12,0.5) and Z-I (12,0.2) with linear lines are most preferable because of their excellent peel-resistant plus excellent oil-resistance after mixing with the copolymer(II).

The above-mentioned melt-index of the polymers is measured by the method is ASTM D-1238-79 (cf. Japanese Industrial Standard K-6730-1973), and their crystalline melting point is the temperature of the highest peak in the melting curve obtained by determining the melting point of the polymer with a differential scanning calorimeter (Type IB, made by Perkin-Elmer Co.) at a temperature rise rate of 8° C./min.

PVDC for use in the present invention is a copolymer of 65 to 95% by weight of vinylidene chloride and 5 to 35% by weight of at least one of unsaturated monomers polymerizable with vinylidene chloride. As the copolymerizable monomer with vinylidene chloride, for instance, vinyl chloride, acrylonitrile and alkyl acrylate of 1 to 18 carbon atoms in the alkyl group are enumerable. Into PVDC, publicly known plasticizer, stabilizer, etc. may be added if necessary.

Since a copolymer(II) of ethylene and alpha-olefin is originally not compatible with PVDC, the laminate made by piling the layer of PVDC and that of the copolymer(II) is apt to be exfoliated. Particularly, since there are many cases according to the present invention where it is necessary to soak the laminate in hot water for a long period for sterilization, the laminate with weak mutual adhesion is apt to be exfoliated thus spoiling the appearance with additional reduction of peel-resistance.

Accordingly, it is necessary in the present invention to provide a layer of strong adhesion between the outermost layer and the center layer to prevent the delamination. As the material for such a layer of strong adhesion, polyolefin modified by carboxylic acid, copolymers of ethylene and vinyl acetate, block copolymer of styrene and butadiene and the like are used, and particularly, a copolymer of ethylene and vinyl acetate containing 13 to 25% by weight of vinyl acetate units or a mixture of copolymers of ethylene and vinyl acetate containing in total of 13 to 25% by weight of vinyl acetate units is preferable. The preferable thickness of such a layer is 1 to 3 microns.

It is preferable to have the thickness of each of the outermost layers of more than 18% of the total thickness of the laminate, and the kinds of the copolymer(II) and EVA, the ratio of mixing of the copolymer(II) to EVA and the thickness of one of the outermost layers may be the same to or different from those of the other of the outermost layers.

In the case where the thickness of the layer playing the role of sealing is less than 18% of the total thickness of the laminate (at least one of the two outermost layers in the case of clasp-sealing and both of the two outermost layers in the case of envelope-sealing), there is a tendency of giving poor peel-resistant. Total thickness of the laminate is preferably about 20 to 100 microns in general. It is necessary to have at least 2 microns of the thickness of the center layer for granting gas-barriering property and the thickness is preferably less than 30% of the total thickness of the laminate because of a tendency of reducing the impact strength in the case of more than 30%.

The cylindrically formed laminate film according to the present invention is extruded by using a circular die similar to that disclosed in Japanese Patent Application Laying Open No. 82888/78 while supplying the melt materials from the number of extruders corresponding to the number of laminate layers. The each layer of the flat laminate film according to the present invention is extruded by using a publicly known T-die while supplying each material from each extruder, and then laminated together.

Figure 2:
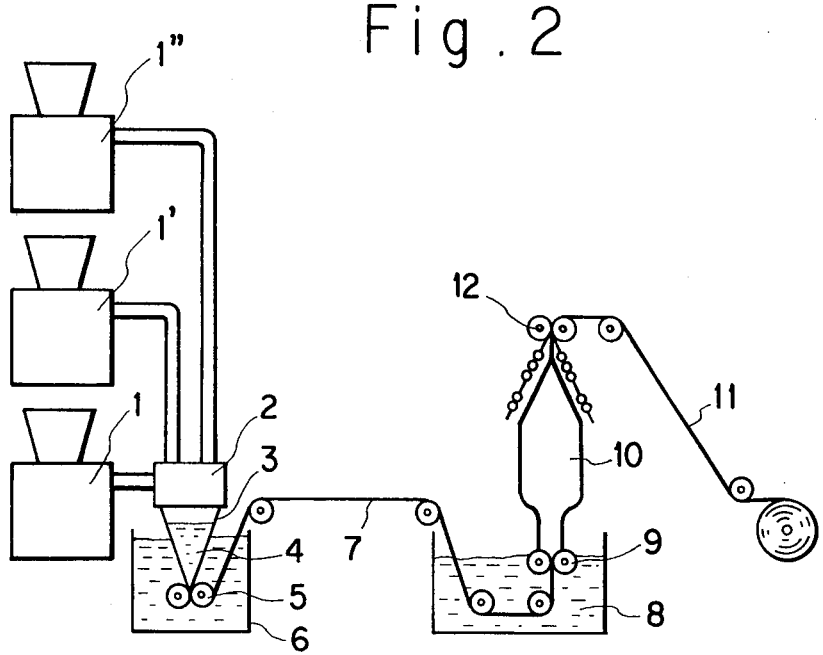
FIG. 2 shows a general chart of the process for preparing the laminate film of the present invention.

A representative process for preparing the cylindrically formed laminate film will be explained as follows while referring to FIG. 2.

The mixture of copolymer(II) and (III), adhesive resin and PVDC are respectively extruded from the three separate extruders (1), (1') and (1") and are supplied to the co-extruding circular die (2) to be a cylindrically formed laminated film (3), which is taken by the pair of nip-rollers (5) installed in a cooling bath (6) containing water maintained at a temperature of lower than 40° C. to be an envelope-formed folded laminate film while being immediately quenched by water in the bath (6) and having a liquid (4) enclosed within the cylindrically formed part of the laminate film (3) squeezed by the nip-rollers (5), the liquid having been introduced for preventing the adhesion of the both two inner walls of the envelope-formed folded laminate film.

Then, the thus quenched envelope-formed laminate film is continuously pulled up from the bath (6) and transferred into a heating bath (8) containing hot water maintained at, for instance, 80° to 110° C. and/or an oven maintained at the same temperature (the oven is omitted from FIG. 2) and passed through the second pair of nip-rollers installed in the bath (8) or the oven while being heated.

Thereafter, the folded laminate film was inflated between the second pair of nip-rollers (9) and the third pair of nip-rollers (12) rotating at a speed of a few times, for instance 1.5 to 4.0 times, of that of the rotation of the second pair of nip-rollers (9) by the air introduced and enclosed between the both two internal walls of the envelope-formed laminate film while being cooled by the ambient atmosphere at ordinary temperature. By this inflation, a biaxial stretching both 1.5 to 4.0 times into longitudinal direction and diametral direction is simultaneously carried out on the laminate film to prepare a heat-shrinkable laminate film (11) of the present invention.

In the case of preparing the flat laminate film, the film extruded from the T-die is once cooled by the chilling rolls right below the die, and then, after being heated to a predetermined temperature, stretched between the pair of rolls into the direction of material flow and stretched into the direction of width by a tenter in a successive biaxial stretching, or stretched simultaneously into both directions of flow-direction and width-direction by a different tenter to be a heat-shrinkable film.

The heat-shrinkable stretched laminate film according to the present invention obtained by the above-mentioned process is excellent in oil-resistance, heat-resistant seal ability, peel resistance and gas-barriering property and desirably used for packing fatty foodstuffs requiring sterilization at a high temperature.

The present invention will be explained more in detail while referring to non limitative examples as follows:

EXAMPLES 1-15:

By using a plurality of extruders corresponding to each combination of resins shown in Table 2 (refer to each member of polymers in Table 1), respective resins of each combination were extruded from the respective extruders and these extruded resins were co-extruded via the co-extruding die to be a cylindrically formed laminate with the desired combination. The thus extruded cylindrically formed laminate was quenched in a cooling bath at about 20° C. to be cylinder of 120 mm in folded width and of 250-980 microns in thickness.

In the thus extruded cylindrically formed laminate, a suitable amount of soybean oil had been enclosed in advance of quenching for the prevention of adhesion of both the inner surfaces of the laminate when it was folded. Then, the cylinder was heated for about 12 sec in a hot water bath maintained at a temperature shown in Table 2 while being transferred in the bath at a rate of 5 m/min and passed between the first nip-rollers of a revoluting rate of 5 m/min. Thereafter, the heated cylinder was stretched by 3 times into the longitudinal direction while being stretched into transvers direction by inflating the cylinder with an air supplied into the cylinder 3.3 times of the original diameter until passing between the second nip-rollers of a revoluting rate of 15 m/min while being cooled by an ambient atmosphere at ordinary temperature. The thus obtained biaxially stretched laminate film was about 360 mm in folded width and about 25-98 microns in thickness.

Table 1 shows the physical properties of each polymer used for preparing the laminate film with an index; Table 2 shows the composition and constitution of the laminate film prepared as above; Table 3 shows the test methods of physical properties of the laminate film and Table 4 shows the test results of the laminate film.

TABLE 1

| | Polymers and Copolymers | | | | |
|---|---|---|---|---|---|
| Index of polymer | Polymers and copolymers | Melt index (g/10 min) | Density (g/cc) | Content of VAc (wt. %) | Crystalline melt. point (°C.) |
| A | PVDC | — | — | — | — |
| B | PVDC | — | — | — | — |
| C | L-LDPE | 2.5 | 0.922 | — | 122 |
| D | L-LDPE | 2.5 | 0.93 | — | 122 |
| E | L-LDPE | 0.7 | 0.922 | — | 120 |
| F | L-LDPE | 1.8 | 0.935 | — | 122 |
| G | Low-density polyethylene | 1.2 | 0.922 | — | 107 |
| H | EVA | 0.3 | 0.93 | 3 | 103 |
| I | EVA | 3.8 | 0.93 | 3.5 | 101 |
| J | EVA | 0.5 | 0.93 | 5 | 97 |
| K | EVA | 2.0 | 0.93 | 5 | 97 |
| L | EVA | 1.1 | 0.93 | 5.5 | 96 |
| M | EVA | 3.3 | 0.93 | 6 | 95 |
| N | EVA | 0.2 | 0.93 | 8 | 94 |
| O | EVA | 0.5 | 0.93 | 9 | 93 |
| P | EVA | 1.5 | 0.93 | 10 | 91 |
| Q | EVA | 3 | 0.93 | 10 | 90 |
| R | EVA | 0.35 | 0.94 | 12 | 85 |
| S | EVA | 0.8 | 0.94 | 12 | 85 |
| T | EVA | 3 | 0.94 | 15 | 82 |
| U | EVA | 6 | 0.95 | 28 | — |
| V | modified EVA by carboxylic acid | 15 | 0.97 | 19 | — |

Notes:
A is a composition of 100 parts of copolymer of vinylidene chloride and vinyl chloride of 80:20 and 1 part of epoxyfied soybean oil.
B is a composition of 100 parts of copolymer of vinylidene chloride and vinyl chloride of 85:15 and 0.5 part of epoxyfied soybean oil.
C and D: Linear low-density polyethylene, commercial name of ULTZEX. (Mitsui Petrochemical Co.)
E and F: Linear low-density polyethylene, commercial name of NEOZEX. (Mitsui Petrochemical Co.)
V is resin for an adhesive, commercial name of ADMER. (Mitsui Petrochemical Co.)

TABLE 2

| Example | Composition and Construction of Laminate Film | | | | | Percentage by weight of vinyl acetate units in copolymer (II) | Temperature of hot water bath °C. |
|---|---|---|---|---|---|---|---|
| | Constitution of each layer | | | | | | |
| | First | Second | Third | Fourth | Fifth | | |
| | | (microns in thickness) | | | | | |
| 1 | C/P = 3/7(14)[1] | T(2) | A(10) | T(2) | C/P = 2/8(32) | 3 | 90 to 92 |
| 2 | F/P = 3/7(14) | K/U = 5/5(2) | A(10) | K/U = 5/5(2) | C/P = 3/7(32) | 0 | 92 to 94 |
| 3 | C/K = 3/7(14) | T(2) | A(10) | T(2) | C/P = 3/7(32) | 0 | 92 to 94 |
| 4 | C/S = 3/7(14) | V(2) | A(10) | V(2) | C/P = 3/7(32) | 0 | 90 to 92 |
| 5 | F/P = 3/7(14) | T(2) | A(10) | T(2) | F/O = 6/4(32) | 1 | 95 to 97 |
| 6 | C/M = 4/6(12) | T(2) | A(10) | T(2) | C/J = 3/7(34) | 3 | 94 to 96 |
| 7 | E/M = 4/6(12) | Q/U = 7/3(2) | A(10) | Q/U = 7/3(2) | E/J = 3/7(34) | 3 | 94 to 96 |
| 8 | C/L = 4/6(16) | T(2) | A(10) | T(2) | C/J = 3/7(30) | 3 | 95 to 97 |
| 9 | C/R = 6/4(24) | T(3) | A(28) | T(3) | C/N = 4/6(40) | 48 | 95 to 97 |
| 10 | E/S = 7/3(10) | T(1) | A(8) | T(1) | C/N = 6/4(20) | 3 | 95 to 97 |
| 11 | D/P = 4/6(12) | T(2) | A(8) | T(2) | D/J = 3/7(34) | 3 | 94 to 96 |
| 12 | C/L = 3/7(12) | T(1) | B(3) | T(1) | C/H = 3/7(10) | 0 | 96 to 98 |
| 13 | F/H = 2/8(10) | Q/U = 7/3(1) | B(3) | Q/U = 7/3(1) | F/H = 2/8(10) | 0 | 96 to 97 |
| 14 | E/I = 4/6(10) | V(1) | B(6) | V(1) | E/J = 3/7(20) | 3 | 95 to 97 |
| 15 | C/Q = 3/7(14) | T(2) | A(10) | T(2) | C/P = 3/7(32) | 0 | 92 to 94 |
| Comparative Example | | | | | | | |
| 1 | C/P = 1/9(20) | T(2) | A(10) | T(2) | G/P = 3/7(26) | — | 90 to 92 |
| 2 | C/P = 8/2(20) | T(2) | A(10) | T(2) | F/P = 3/7(26) | — | 94 to 96 |
| 3 | C/P = 3/7(14) | — | A(10) | — | C/P = 2/8(32) | — | 90 to 92 |
| 4 | G(14) | — | A(10) | — | G(32) | — | — |
| 5 | F/Q = 1/9(9) | T(2) | A(10) | T(2) | F/Q = 2/8(37) | — | 90 to 92 |
| 6 | F/T = 2/8(9) | T(2) | A(10) | T(2) | F/T = 2/8(37) | — | 90 to 92 |

Note:
(C/P = 3/7) means that the polymer used for the first layer was a mixture of polymer C and polymer P in Table 1 at a weight ratio of 3 to 7.

TABLE 3

| Item | Methods of Determination |
|---|---|
| | Method |
| Rate of shrinkage in hot water | A specimen of 10 cm in length and also in width cut out from the laminate film is immersed into hot water at 90° C. in a relaxed state for one minute. The rate of linear shrinkage of the film into direction of length, and that into direction of width were respectively expressed by L and T in percentage as compared to the original dimensions. |
| Oil-resistance | Vacuum-packed meat loaf with the specimen is immersed into hot water at 90° C. on which surface an oil is intentionally floated for 8 min, or vacuum-packed roast pork (Chinese style) with the specimen is immersed into the same manner for 10 min. After cooling the foodstuff, the damage of the outermost layer is observed. |
| Heat-resistant seal ability and peel resistance | Heat-sealed specimen (clasp-type sealing or envelope-type sealing) is stretched onto an embroidary frame with about 5% of reserve, and after painting lard on the specimen, it is immersed into hot water of 85° C. The time until the seal part is broken is measured in sec. |

TABLE 4

| Example | Test Results of Laminate Film | | | | | |
|---|---|---|---|---|---|---|
| | Stretchability | Rate of heat-shrinkage (%, L/T[1]) | Oil-resistance of the layers | | Heat-resistant seal ability | Gas-barriering property (cc/cm² · day · atom.) |
| | | | First | Fifth | | |
| 1 | possible | 42/47 | 1 | 2 | 2 | 2 |
| 2 | possible | 37/41 | 1 | 2 | 2 | 2 |
| 3 | possible | 39/42 | 1 | 2 | 2 | 2 |
| 4 | possible | 40/45 | 1 | 2 | 2 | 2 |
| 5 | possible | 30/36 | 1 | 2 | 2 | 2 |
| 6 | possible | 35/39 | 1 | 2 | | 2 |
| 7 | possible | 33/41 | 1 | 2 | | 2 |
| 8 | possible | 36/38 | 1 | 2 | 1 | 2 |
| 9 | possible | 32/37 | 1 | 2 | | 5 |
| 10 | possible | 37/42 | 1 | 2 | | 2 |
| 11 | possible | 37/40 | 1 | 2 | | 2 |
| 12 | possible | 38/35 | 1 | 2 | 1 | 8 |
| 13 | possible | 32/35 | 1 | 2 | 1 | 8 |
| 14 | possible | 35/39 | 1 | 2 | | 4 |
| 15 | possible | 38/43 | 2 | 2 | 2 | 2 |
| Comparative Example | | | | | | |
| 1 | possible | 43/47 | 2 | 2 | 2 | 2 |
| 2 | with minute necking | 32/36 | 2 | 2 | 2 | 2 |
| 3 | possible | 42/46 | 2 | 2 | 2 | 2 |
| 4 | hardly stretchable | — | — | — | — | — |

TABLE 4-continued

| | | Test Results of Laminate Film | | | | |
| --- | --- | --- | --- | --- | --- | --- |
| Example | Stretch-ability | Rate of heat-shrinkage (%, L/T[1]) | Oil-resistance of the layers | | Heat-resistant seal ability | Gas-barrier-ing property (cc/cm² · day · atom.) |
| | | | First | Fifth | | |
| 5 | possible | 44/48 | 3 | 2 | 2 | 42 |
| 6 | possible | 45/48 | 3 | 3 | 3 | 42 |

Note:
Oil-resistance is evaluated as: 1 no change found on meatloaf and pork; 2 no change found on meatloaf; 3 breakage found on the outermost layer.
Peel-resistant is evaluated as: 1 over 60 sec, 2 less than 60 sec and more than 10 sec, and 3 less than 10 sec.
[1]envelope-type sealing. The remainder is clasp-type sealing.
In the case of clasp-type sealing, the fifth layer becomes to be the seal surface.

As are seen in Examples 1 to 15 in Table 4, the laminate film according to the present invention showed excellent stretchability, oil-resistance, peel-resistant and gas-barrier property.

The laminate film of Comparative Example 1 showed breaking in oil-resistance test, and showed poor peel-resistant because of the content of the copolymer(II) in the first layer of 10% by weight, and of the crystalline melting point of the low-density polyethylene of lower than 110° C.

The laminate film of Comparative Example 2 showed poor stretchability with minute neckings because of the content of EVA in the first layer of less than 30% by weight.

The laminate film of Comparative Example 3 showed poor peel-resistance because of the lack of any adhesive layers.

The laminate film of Comparative Example 4 was impossible to be obtained because both the first and the fifth layers were to be composed of low-density polyethylene without using any adhesive layers.

The laminate film of Comparative Example 5 was poor in oil-resistance because of the content of the copolymer(II) in the first layer of 10% by weight.

The laminate film of Comparative Example 6 was poor in oil-resistance because of the crystalline melting point of EVA in the first layer and the fifth layer of as low as 82° C., and poor in peel-resistant.

What is claimed is:

1. A laminate film having a heat-shrinkage rate of greater than 15% at 90° C., comprising a center layer consisting of a copolymer (I) of vinylidene chloride; at least two outermost layers each consisting of a mixture of 20 to 70% by weight of copolymer(II) of ethylene and alpha-olefin having a crystalline melting point of 110° to 125° C., and 80 to 30% by weight of a copolymer(III) of ethylene and vinyl acetate having a crystalline melting point of 85° to 103° C., said copolymer(II) being less than 65% by weight of the total amount of copolymers (II) and (III) in both of the outermost layers; and an adhesive layer between the center layer and the outermost layers.

2. A laminate film according to claim 1, wherein said copolymer(I) comprises 65 to 95% by weight of vinylidene chloride and 35 to 5% by weight of at least one unsaturated monomer copolymerizable with vinylidene chloride.

3. A laminate film according to claim 1, wherein said copolymer(II) is a copolymer of ethylene and one or more alpha-olefins selected from the group consisting of butene-1, pentene-1, 4-methylpentene-1, hexene-1 and octene-1.

4. A laminate film according to claim 1, wherein said copolymer(III) falls in the pentagonal range defined in FIG. 1 by linear lines connecting the points (W-1), (W-II), (X-II), and (Z-I), respectively.

5. A laminate film according to claim 1, wherein said adhesive layer comprises a polymer or a mixture of polymers selected from the group consisting of polyethylene modified by a carboxylic acid, a copolymer of ethylene and vinyl acetate.

6. A laminate film according to claim 1, or claim 5 wherein the thickness of said adhesive layer is in the range of 1 to 3 microns.

* * * * *